United States Patent [19]

Maurice

[11] Patent Number: 4,601,481
[45] Date of Patent: Jul. 22, 1986

[54] PORTABLE BOAT DOLLY

[76] Inventor: George E. Maurice, R.R. 3, Clinton, Ind. 47842

[21] Appl. No.: 674,087

[22] Filed: Nov. 23, 1984

[51] Int. Cl.⁴ .............................................. B62B 1/14
[52] U.S. Cl. ............................ 280/47.13 B; 114/344; 410/100
[58] Field of Search ..................... 114/344; 410/96, 97, 410/99, 100; 280/414.2, 35, 47.13 B

[56]  References Cited

U.S. PATENT DOCUMENTS

| | | | |
|---|---|---|---|
| 1,717,358 | 6/1929 | Adcock et al. | 280/35 |
| 2,442,266 | 5/1948 | Davis | 410/96 |
| 2,688,494 | 9/1954 | Wilson | 280/47.13 B |
| 2,909,378 | 10/1959 | Borchers, Jr. | 280/414.2 |
| 2,970,846 | 2/1961 | Boston | 280/40 |
| 2,978,257 | 4/1961 | Barker | 280/414.2 X |
| 3,046,034 | 7/1962 | Herrick | 280/35 |
| 3,101,203 | 8/1963 | Raymond | 280/35 |
| 3,164,392 | 1/1965 | Lane | 280/47.13 B |
| 3,271,798 | 9/1966 | Zoretic | 114/344 |
| 3,567,241 | 3/1971 | Foschino | 280/414.2 X |
| 3,687,476 | 8/1972 | Abbott | 280/414.2 X |
| 4,392,665 | 7/1983 | Miller et al. | 280/414.2 |
| 4,422,665 | 12/1983 | Hinnant | 280/414.2 |

FOREIGN PATENT DOCUMENTS 175479  2/1922  United Kingdom ............ 280/414.2

*Primary Examiner*—John J. Love
*Assistant Examiner*—Michael Mar
*Attorney, Agent, or Firm*—Woodard, Weikart, Emhardt & Naughton

[57] ABSTRACT

A readily mountable and removable portable boat dolly for mounting to a boat to aid in transporting the boat over land is shown, including a pair of wheel support units, each having a mounting surface for frictionally engaging the bottom of the boat. A pair of wheels are rotatably mounted to each of the wheel support units. A mounting strap engages the wheel support units below the mounting surfaces thereof, with the strap having hooks at both ends configured for hooking over the gunwales of the boat. Levers are provided for applying and maintaining tension in the mounting strap, whereby the mounting surfaces of the wheel support units are held in frictional engagement with the bottom of the boat.

4 Claims, 4 Drawing Figures

PORTABLE BOAT DOLLY

BACKGROUND OF THE INVENTION

1. Field of the Invention

This invention relates to wheeled dollies for transporting boats over land and in particular to a portable boat dolly which can be readily attached to and removed from boats of various hull sizes.

2. Background of the Prior Art

Those who enjoy recreational fishing from small boats are well aware of the fact that the most desirable bodies of water are often not easily accessible from improved roads. In order to reach such preferred fishing spots, it is necessary to portage one's boat (and related gear) over land under human power, which is an awkward and tiring exercise.

Various devices for aiding in the transportation of boats over land have been proposed. One device which could be used to alleviate the above mentioned problem of portaging is described in U.S. Pat. No. 3,101,203 to Raymond, issued Aug. 20, 1963. Raymond's device comprises an axle fixable transversely across the gunwales of a boat with a pair of wheels mounted to the ends of the axle. By turning the boat upside down, and lifting it at the stern, the boat may be transported in wheelbarrow fashion. A disadvantage of this device is that it makes it impossible to leave one's gear in the boat while portaging due to the necessity of turning the boat over to bring the wheels into contact with the ground.

Another device useful for portaging which can be attached to the underside of the boat is shown in U.S. Pat. No. 2,688,494 to Wilson, issued Sept. 7, 1954. Wilson shows a pair of side members having hooks at their upper extremities for engaging the gunwales of a boat. The side members extend downwardly along the sides of the boat and each is rigidly affixed at its lower extremity to an angle bracket which engages the the boat at the junction of the bottom and sidewalls. Each angle bracket supports an outboard axle upon which a wheel is rotatably mounted. A flexible rope aided by pulleys connects the two angle brackets together beneath the boat. A disadvantage of this device is that the side members and angle brackets are not readily adaptable to fit boats of various sizes and configurations. Also, it will not work well with boats which do not have a well defined corner at the junction of the bottom and side for the angle bracket to engage. In addition, the device shown in Wilson does not allow for easy removal while the boat is in the water without the risk of losing one of the wheel and bracket assemblies. If the flexible rope should slip from one's hand, it would reeve freely through the pulleys and one side of the device could be lost.

SUMMARY OF THE INVENTION

A readily mountable and removable portable boat dolly for mounting to a boat to aid in transporting the boat over land includes a wheel support unit having a mounting surface for frictionally engaging the bottom of the boat and a wheel rotatably mounted to the wheel support unit. A mounting strap is provided in engagement with the wheel support unit. The mounting strap has hooks configured for hooking over the gunwales of the boat. Means for applying and maintaining tension in the strap are provided so that the mounting surface of the wheel support unit is held in frictional engagement with the bottom of the boat.

It is an object of the invention to provide a readily mountable and removable portable boat dolly which can be easily mounted to boats of various sizes and bottom configurations.

Further objects and advantages of the present invention will become apparent from the following description.

DESCRIPTION OF THE PREFERRED EMBODIMENT

Figure 1:
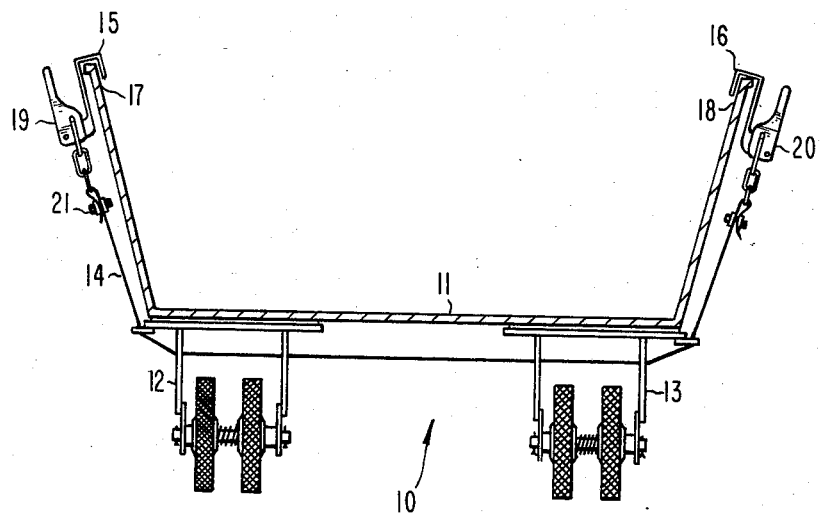
FIG. 1 is a rear elevational view of a portable boat dolly made in accordance with the present invention shown attached to a boat, the boat being shown in section taken along line 1—1 of FIG. 2.
Figure 2:
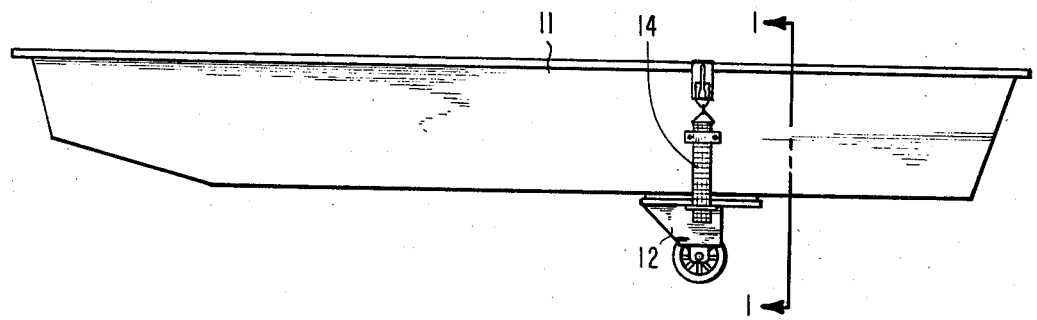
FIG. 2 is a left side elevational view of the portable boat dolly and boat of FIG. 1.

Referring in particular to FIGS. 1 and 2, there is illustrated a portable boat dolly 10 made in accordance with the present invention. Boat dolly 10 is shown attached to a typical small open-topped fishing boat 11. As shown, boat dolly 10 includes a pair of wheel support units 12 and 13 which frictionally engage the bottom of boat 11. A mounting strap 14 passes through and engages each of the wheel support units 12 and 13. Attached to the ends of mounting strap 14 are hooks 15 and 16 which are configured for hooking over the gunwales 17 and 18 of boat 11. Hooks 15 and 16 are each provided with tensioning levers 19 and 20 for applying and maintaining tension in mounting strap 14 so that wheel support units 12 and 13 are each held in secure engagement with the bottom of boat 11. Hooks having tensioning levers for applying and maintaining tension in an attached strap are well known, typically being used in a variety of tie-down applications.

As is apparent from the figures, portable boat dolly 10 is readily mountable to and removable from a boat. To mount boat dolly 10, each wheel support unit is placed against the bottom of boat 11 at any selected location, although the preferred location is at the point of balance along the longitudinal axis of the boat, thereby enabling one person to easily wheel the mounted boat about without having to lift either end of the boat. The wheel support units preferably are spaced apart transversely for maximum stability. The length of mounting strap 14 is adjusted near where it attaches to hook 19 by folding mounting strap 14 back on itself and securing it at the selected length by tightening clamp 21. Clamp 21 is similar to clamp 45 which is described in greater detail below. Hooks 15 and 16 are then hooked over the gunwales and levers 19 and 20 are moved to apply tension to mounting strap 14. To remove boat dolly 10, the above steps are reversed.

Figure 3:
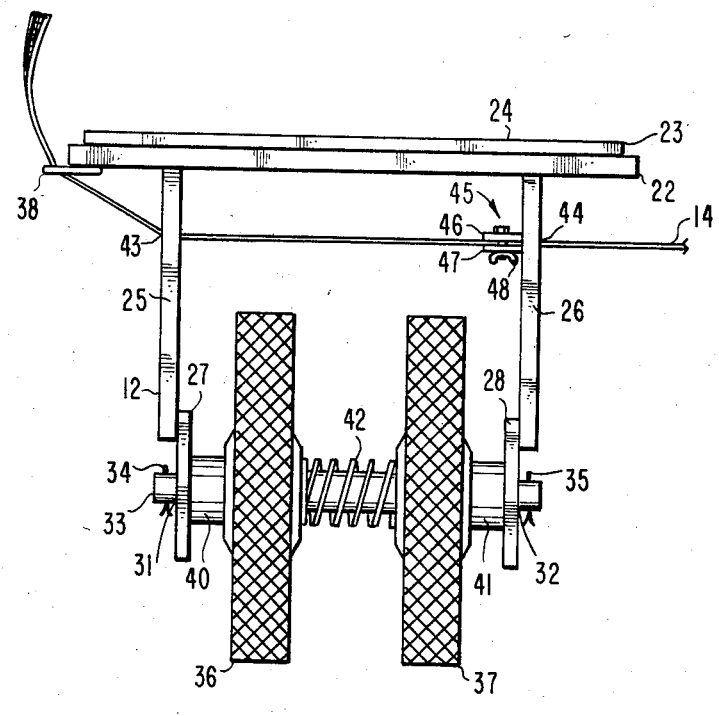
FIG. 3 is a detailed rear elevational view of the left wheel support unit of the portable boat dolly of FIG. 1.
Figure 4:
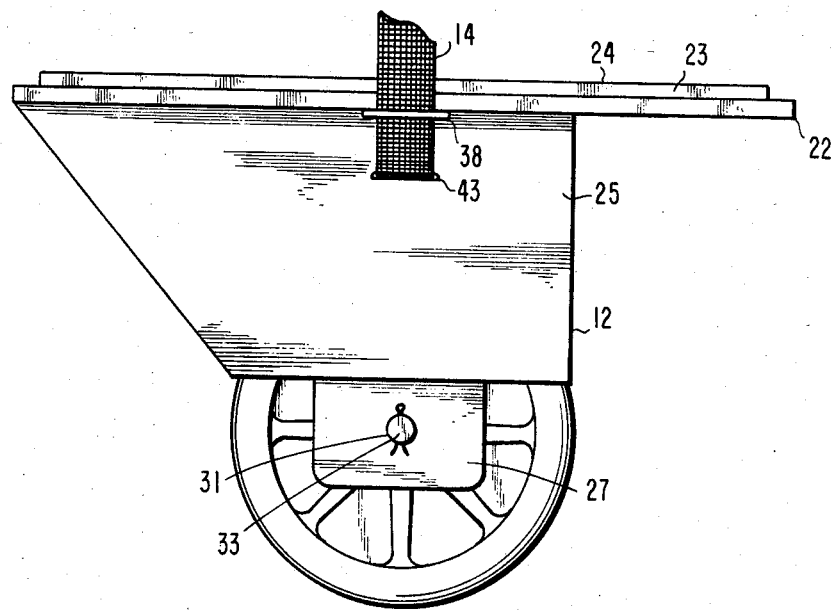
FIG. 4 is a detailed left side elevation view of the left wheel support unit of the portable boat dolly of FIG. 1.

Referring in particular to FIGS. 3 and 4, there is shown in greater detail the configuration of wheel support unit 12, which is described below. The following description applies as well to wheel support unit 13 which is virtually identical to, although a mirror image of, wheel support unit 12. Wheel support unit 12 includes a flat steel mounting plate 22. Attached to the top side of mounting plate 22 is a flat rubber sheet 23 having a mounting surface 24 for frictionally engaging the bottom of boat 11. Sheet 23 serves as a padding to prevent damage to the bottom of boat 11 as well as serving to prevent lateral slipping of plate 22 with respect to the bottom of boat 11. Welded to and extending downwardly from the underside of plate 22 are a pair of steel axle support brackets 25 and 26 including extension brackets 27 and 28. The front edges of axle support brackets 25 and 26 are inclined at an angle of approximately 45° from vertical. These inclined edges aid wheel support unit 12 to override obstacles, such as logs, which might be encountered while portaging boat 11. Disposed through apertures 31 and 32 in extension brackets 27 and 28 is steel axle 33. Cotter pins 34 and 35 hold axle 33 in place.

Although wheel support unit 12 as illustrated is constructed from welded steel plates, it is contemplated that other suitable materials could be used. For example, wheel support unit 12 could be molded in high strength plastic.

Rotatably mounted on axle 33 are a pair of wheels 36 and 37 having bushing type bearings (not shown). Sleeves 40 and 41 space wheels 36 and 37 inwardly from extension brackets 27 and 28 to prevent interference therebetween. Mounted coaxially about axle 33 between wheels 36 and 37 is a coil spring 42, in compression. Coil spring 42 biases wheels 27 and 28 apart against sleeves 40 and 41. Normally, as boat 11 with portable boat dolly 10 attached is wheeled about, wheels 36 and 37 are disposed against sleeves 40 and 41, respectively. However, if due to the terrain or turning maneuvers there is a sudden axial force applied to the wheels, coil spring 42 tends to absorb such shocks and help prevent boat 11 from overturning.

Disposed through axle support brackets 25 and 26 are slots 43 and 44 which are spaced downwardly from mounting plate 22 but above the top of wheels 36 and 37. Reeved through U-shaped strap guide 38 and slots 43 and 44 is mounting strap 14. When mounting strap 14 is pulled taut as previously described, it directs an upward force against the tops of slots 43 and 44, thereby directing wheel support unit 12 upwardly in frictional engagement with boat 11.

To facilitate mounting of portable boat dolly 10 when it is to be repeatedly mounted to the same boat, clamp 45 is provided. Clamp 45 includes a pair of clamping plates 46 and 47, with mounting strap 14 sandwiched therebetween, and two bolt and nut pairs 48 connecting plates 46 and 47 together on either side of mounting belt 14. Preferably, at least one of the bolt and nut pairs 48 includes a wing nut for easy mounting and removal. Once wheel support units 12 and 13 have been mounted satisfactorily to a particular boat, clamp 45 is slid into engagement with axle support bracket 26 and clamped tightly to strap 14. A similar clamp is mounted to strap 14 proximate the corresponding axle support bracket of wheel support unit 13. Thereafter, clamp 45 and its counterpart serve to aid in spacing wheel support units 12 and 13 apart the same distance as was previously found to be satisfactory for that boat.

While the preferred embodiment of the invention has been illustrated and described in some detail in the drawings and foregoing description, it is to be understood that this description is made only by way of example to set forth the best mode contemplated by me of carrying out my invention and not as a limitation to the scope of my invention which is pointed out in the claims below.

What is claimed is:

1. A readily mountable and removable portable boat dolly for mounting to a boat to aid in transporting said boat over land, comprising:

a pair of spaced independent wheel support units, each having a mounting surface made of high friction, resilient, rubber-like material for frictionally engaging the bottom of said boat, a mounting plate for supporting said mounting surface, and a pair of spaced axle support members extending downwardly from said mounting plate;

a wheel rotatably mounted to each of said wheel support units, said wheel being carried on an axle disposed between and supported by said axle support members;

a continuous mounting strap having hooks at both ends configured for hooking over the gunwales of said boat;

strap mounting means for maintaining said mounting strap in engagement with both of said wheel support units below the mounting surfaces thereof such that upward force applied to the hooks is applied upwardly via said strap to said wheel support units, and such that said mounting strap is slidable along its length with respect to said wheel support units;

adjustable means attached to said strap for limiting the spacing of said pair of wheel support units to a predetermined distance; and strap tensioning means for applying and maintaining tension in said mounting strap, including a pivoted lever attached to at least one of the hooks, the mounting strap being attached to the lever, the lever being movable from a first orientation wherein said strap is slack to a second orientation wherein said strap is drawn taut, whereby the mounting surfaces of said wheel support units are drawn upward by said mounting strap and held in frictional engagement with the bottom of said boat.

2. The portable boat dolly of claim 1, wherein said strap mounting means includes slots through the axle support units, with said strap being disposed through the slots in the axle support members of each wheel support unit.

3. The portable boat dolly of claim 2, wherein said spacing limiting means includes a clamp configured for clamping to said strap at a selected location thereon.

4. A readily mountable and removable portable boat dolly for mounting to a boat to aid in transporting said boat over land, comprising:

a pair of wheel support units, each having a mounting surface made of high friction, resilient, rubber-like material for frictionally engaging the bottom of said boat, each of said wheel support units including a mounting plate for supporting said mounting surface, and a pair of spaced axle support members extending downwardly from said mounting plate, said wheel being carried on an axle disposed between and supported by said axle support members;

a wheel rotatably mounted to each of said wheel support units, each wheel including a pair of spaced coaxial wheel sections biased apart by a coil spring;

a mounting strap in engagement with said wheel support units below the mounting surfaces thereof, said strap having hooks at both ends configured for hooking over the gunwales of said boat; and means for applying and maintaining tension in said mounting strap, whereby the mounting surfaces of said wheel support units are held in frictional engagement with the bottom of said boat.

* * * * *